Patented May 21, 1929.

1,714,033

UNITED STATES PATENT OFFICE.

HARRY C. LOUDENBECK, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

GASKET AND PROCESS OF TREATING.

No Drawing.   Application filed December 20, 1926.   Serial No. 156,066.

This invention relates to gaskets, and more particularly to a treated gasket and the method of treating the same.

Gaskets made of vulcanized rubber compounds, including flat gaskets such as are employed between metal surfaces to prevent leakage, are subject to deterioration with age and what is termed "bloom" forms on the surfaces of the gasket and tends to interfere with the gasket making a leak tight seat.

The principal object of my invention is to provide a rubber composition gasket so treated that aging is retarded and "blooming" is reduced.

In order to accomplish the desired end, I provide a bath of melted wax, preferably paraffine wax, and preferably heated to a temperature of from 200 to 250 degrees Fahrenheit. The gaskets to be treated are dipped in this bath and allowed to remain therein for a period of preferably three to five minutes. The gaskets are then removed from the bath and the excess wax is removed, preferably by subjecting the gaskets to an air blast or by subjecting the gaskets to centrifugal action.

Old gaskets treated in the above manner are revived and any bloom, dirt, or rust which may be present on the old gaskets is washed off in the bath.

It has been found after severe service tests that the treatment retards aging and prevents the formation of "bloom" on the gasket. At the same time, the treatment does not have any detrimental effect on the gaskets. The gaskets are also rendered more pliable and the treatment tends to prevent sticking of the gaskets on metal surfaces to which the gasket may be applied.

Having now described my invention, what I claim as new and desire to secure by Letters Patent, is:—

1. The method of treating composition rubber gaskets which consists in dipping the gaskets in a bath of paraffine wax heated to a temperature from 200 to 250 degrees Fahrenheit.

2. The method of treating composition rubber gaskets which consists in dipping the gaskets in a bath of melted wax heated to a temperature of from 200 to 250 degrees Fahrenheit and allowing the gaskets to remain in the bath for a period of from three to five minutes.

In testimony whereof I have hereunto set my hand.

HARRY C. LOUDENBECK.